US012175653B2

United States Patent
Oshima et al.

(10) Patent No.: US 12,175,653 B2
(45) Date of Patent: Dec. 24, 2024

(54) DEFECT POSITION DETERMINATION SYSTEM, APPEARANCE INSPECTION METHOD AND PROGRAM

(71) Applicant: NEC Corporation, Tokyo (JP)

(72) Inventors: Yuka Oshima, Tokyo (JP); Takuroh Kashima, Tokyo (JP); Yusuke Koitabashi, Tokyo (JP); Atsushi Matsuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 437 days.

(21) Appl. No.: 17/770,109

(22) PCT Filed: Oct. 5, 2020

(86) PCT No.: PCT/JP2020/037747
§ 371 (c)(1),
(2) Date: Apr. 19, 2022

(87) PCT Pub. No.: WO2021/079728
PCT Pub. Date: Apr. 29, 2021

(65) Prior Publication Data
US 2022/0392057 A1    Dec. 8, 2022

(30) Foreign Application Priority Data
Oct. 25, 2019    (JP) ................... 2019-194144

(51) Int. Cl.
*G06T 7/00* (2017.01)
*G01N 21/88* (2006.01)
*G06T 7/70* (2017.01)

(52) U.S. Cl.
CPC ....... *G06T 7/0008* (2013.01); *G01N 21/8851* (2013.01); *G06T 7/70* (2017.01); *G01N 2021/8861* (2013.01)

(58) Field of Classification Search
CPC    G06T 7/0008; G06T 7/70; G06T 7/75; G06T 7/0002; G06T 2207/20081;
(Continued)

(56) References Cited

U.S. PATENT DOCUMENTS 10,452,915 B1 * 10/2019 Chikkaveerappa ... G06F 40/279
10,818,042 B1 * 10/2020 Tang ........................ G06T 7/73
(Continued)

FOREIGN PATENT DOCUMENTS

JP    H04-308979 A    10/1992
JP    H11-63959 A    3/1999
(Continued)

OTHER PUBLICATIONS

Japanese Office Communication for JP Application No. 2021-554232 mailed on Feb. 14, 2023 with English Translation.
(Continued)

*Primary Examiner* — Aaron W Carter
(74) *Attorney, Agent, or Firm* — Sughrue Mion, PLLC

(57) ABSTRACT

A first imaging unit 71 generates a first image a first image by taking an object to be inspected. A guide display unit 72 determines the object to be inspected from the first image by using a model for determining an object to be inspected from an image, and displays an illustration representing the object to be inspected as a guide. A second imaging unit 73 generates a second image by superimposing on the guide, and taking the object to be inspected with a recognizable marker regardless of color of an appearance of an object to be inspected, attached in a vicinity of a defect. A defect position determination unit 74 determines a position of the defect included in the object to be inspected based on a positional relationship between the illustration and the marker included in the second image. An information collecting unit 75 collects defect information associated with a (Continued)

type of the object to be inspected and the position of the defect.

8 Claims, 9 Drawing Sheets

(58) Field of Classification Search
CPC ...... G06T 2207/30204; G01N 21/8851; G01N 2021/8861; G01N 2021/888; G01N 2021/889
See application file for complete search history.

(56) References Cited

U.S. PATENT DOCUMENTS

| | | | |
|---|---|---|---|
| 10,846,661 B2* | 11/2020 | Tang | G06T 7/70 |
| 2011/0025828 A1 | 2/2011 | Ishiyama | |
| 2011/0218825 A1* | 9/2011 | Hertenstein | G06Q 40/08 |
| | | | 715/849 |
| 2015/0363076 A1* | 12/2015 | Komatsu | G06F 3/04842 |
| | | | 715/765 |
| 2017/0132554 A1* | 5/2017 | Oonishi | G06V 40/28 |
| 2018/0165541 A1 | 6/2018 | Amico et al. | |
| 2019/0197356 A1* | 6/2019 | Kurita | G06F 18/2178 |
| 2019/0278994 A1* | 9/2019 | Bumpas | G06N 3/045 |
| 2020/0134800 A1* | 4/2020 | Hu | G06V 10/25 |
| 2021/0224976 A1* | 7/2021 | Yonezawa | B60K 35/00 |
| 2022/0301148 A1* | 9/2022 | Hur | G07C 5/0866 |
| 2022/0392057 A1* | 12/2022 | Oshima | G06T 7/0008 |
| 2023/0401688 A1* | 12/2023 | Mishina | G01N 21/01 |

FOREIGN PATENT DOCUMENTS

| | | |
|---|---|---|
| JP | H11-78807 A | 3/1999 |
| JP | 2003-075361 A | 3/2003 |
| JP | 2011-035509 A | 2/2011 |
| JP | 2017-9528 A | 1/2017 |
| JP | 2017-055182 A | 3/2017 |

OTHER PUBLICATIONS

International Search Report for PCT Application No. PCT/JP2020/037747, mailed on Dec. 8, 2020.
English translation of Written opinion for PCT Application No. PCT/JP2020/037747, mailed on Dec. 8, 2020.

* cited by examiner

DEFECT POSITION DETERMINATION SYSTEM, APPEARANCE INSPECTION METHOD AND PROGRAM

This application is a National Stage Entry of PCT/JP2020/037747 filed on Oct. 5, 2020, which claims priority from Japanese Patent Application 2019-194144 filed on Oct. 25, 2019, the contents of all of which are incorporated herein by reference, in their entirety.

TECHNICAL FIELD

The present invention relates to a defect position determination system, a terminal device, a defect position determination method, an appearance inspection method and an appearance inspection program for determining the position of a defect in a product.

BACKGROUND ART

Painted products, such as automobile bodies, can have various defects during the manufacturing and distribution processes of the products. For example, unevenness in the paint due to dust bites in the painting line, uneven color in the paint, and scratches during the painting process or during transportation are examples of such defects. Generally, such defects are inspected at the time of manufacture or before the product is sold by the dealer.

For example, Patent Literature 1 describes a surface inspection device for inspecting defects on the surface of automobiles. The surface inspection device described in Patent Literature 1 irradiates light onto the inspected surface of the object to be inspected, forms a light-receiving image based on the reflected light from the inspected surface, and detects defects present on the inspected surface based on the light-receiving image.

CITATION LIST

Patent Literature

PTL 1: Japanese Patent Application Laid-Open No. H11-63959

SUMMARY OF INVENTION

Technical Problem

In order to fundamentally improve the defects that occur, it is essential to collect information about the defects. However, defects found in the distribution process (for example, at a dealer) are generally collected manually. However, manually determining the position of defects requires a lot of cost, and the determined data is not always accurate. Therefore, it is difficult to analyze the trend of defects in the manufacturing process and to improve the source of defects.

For example, when a defect is detected at a dealer, an image of the defect location is generally taken manually at the dealer, and the manufacturer (maker) who obtains the image determines the type and size of the defect from the image. However, unlike the manufacturing line, the situation in which the defect is taken is not fixed, so the image of the defect taken differs depending on the position and angle at which the defect is taken. Therefore, it is difficult to accurately determine the position of the defect from such images.

In the surface inspection device described in Patent Literature 1, a light-receiving image is formed on the manufacturing line to detect defects. In other words, by placing this surface inspection device at a specific position in the manufacturing line, it is possible to obtain the position of defects, the contents of those defects, and the size of the defects. However, it is difficult to introduce a surface inspection device like the one described in Patent Literature 1 to individual dealers.

Therefore, it is an exemplary object of the present invention to provide a defect position determination system, a terminal device, a defect position determination method, an appearance inspection method, and an appearance inspection program capable of accurately collecting information on the position of a defect while reducing the man-hours required to determine the position of the defect.

Solution to Problem

A defect position determination system according to the exemplary aspect of the present invention includes: a first imaging unit which generates a first image by taking an object to be inspected; a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; a defect position determination unit which determines a position of the defect included in the object to be inspected based on a positional relationship between the illustration and the marker included in the second image; and an information collecting unit which collects defect information associated with a type of the object to be inspected and the position of the defect.

Another defect position determination system according to the exemplary aspect of the present invention includes: a terminal device; and a server device, wherein the terminal device including: a first imaging unit which generates a first image by taking an object to be inspected; a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; and a transmitting unit which transmits the generated second image to the server device, wherein the server device including: an input unit which receives input of the second image; a defect position determination unit which determines the position of the defect included in the object to be inspected based on a positional relationship between the illustration and the marker included in the second image; and an information collecting unit which collects defect information associated with a type of the object to be inspected and the position of the defect.

A defect position determination method according to the exemplary aspect of the present invention includes: generating a first image by taking an object to be inspected; determining the object to be inspected from the first image by using a model for determining an object to be inspected from an image, and displaying an illustration representing the object to be inspected as a guide; generating a second image by superimposing on the guide, and taking the object to be inspected with a recognizable marker regardless of color of an appearance of an object to be inspected, attached in a vicinity of a defect; determining a position of the defect included in the object to be inspected based on a positional relationship between the illustration and the marker included in the second image; and collecting defect information associated with a type of the object to be inspected and the position of the defect.

An appearance inspection method according to the exemplary aspect of the present invention includes: generating a first image by taking an object to be inspected; determining the object to be inspected from the first image by using a model for determining an object to be inspected from an image, and displaying an illustration representing the object to be inspected as a guide; generating a second image by superimposing on the guide, and taking the object to be inspected with a recognizable marker regardless of color of an appearance of an object to be inspected, attached in a vicinity of a defect; determining a position of the defect included in the object to be inspected based on a positional relationship between the illustration and the marker included in the second image; and transmitting the determined defect position to a server device collecting defect information associated with a type of the object to be inspected and the position of the defect.

A appearance inspection program according to the exemplary aspect of the present invention causes a computer to execute: first imaging process of generating a first image by taking an object to be inspected; guide display process of determining the object to be inspected from the first image by using a model for determining an object to be inspected from an image, and displaying an illustration representing the object to be inspected as a guide; second imaging process of generating a second image by superimposing on the guide, and taking the object to be inspected with a recognizable marker regardless of color of an appearance of an object to be inspected, attached in a vicinity of a defect; defect position determination process of determining a position of the defect included in the object to be inspected based on a positional relationship between the illustration and the marker included in the second image; and transmission process of transmitting the determined defect position to a server device collecting defect information associated with a type of the object to be inspected and the position of the defect.

Advantageous Effects of Invention

According to the exemplary aspect of the present invention, it is possible to accurately collect information on the position of a defect while reducing the man-hours required to determine the position of the defect.

DESCRIPTION OF EMBODIMENTS

Hereinafter, an exemplary embodiment of the present invention is described with reference to the drawings.

Exemplary Embodiment 1

Figure 1:
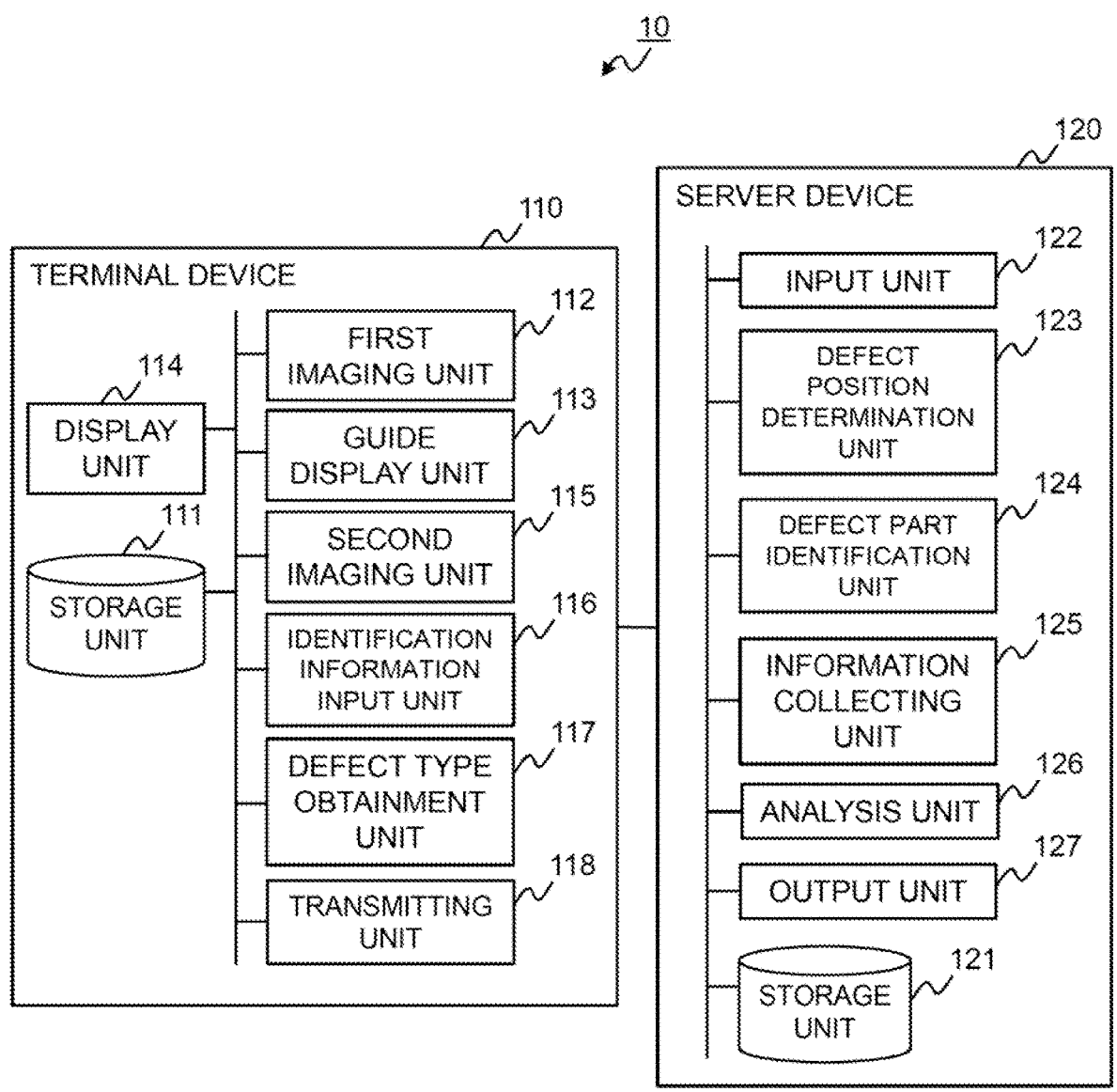
FIG. 1 It depicts a block diagram showing a configuration example of the first exemplary embodiment of a defect position determination system according to the present invention.

FIG. 1 is a block diagram showing a configuration example of the first exemplary embodiment of a defect position determination system according to the present invention. A defect position determination system 10 of this exemplary embodiment includes a terminal device 110 and a server device 120. The terminal device 110 and the server device 120 are connected to each other through a communication network.

The terminal device 110 includes a storage unit 111, a first imaging unit 112, a guide display unit 113, a display unit 114, a second imaging unit 115, an identification information input unit 116, a defect type obtainment unit 117, and a transmitting unit 118.

The storage unit 111 stores various information necessary for the terminal device 110 to perform processing. Specifically, the storage unit 111 stores a model by which the guide display unit 113, described below, determines the object to be inspected from the target image. For example, if the object to be inspected is an automobile, the above model corresponds to a model for determining an automobile. The storage unit 111 may also store a model for determining the type and orientation of the object to be inspected from the target image. In this case, for example, if the object to be inspected is an automobile, the above model corresponds to a model for determining the type of automobile and the orientation of the automobile.

The storage unit 111 may also store an attribute of the object to be inspected in association with identification information that can uniquely identify the object to be inspected. For example, if the object to be inspected is an automobile, the identification information is a vehicle identification number (VIN), etc., and the attribute information is a production date, a production plant, a production country, etc. This information may be stored in the storage unit 121 of the server device 120 described below.

The first imaging unit 112 generates a first image by taking an object to be inspected. Specifically, the first imaging unit 112 generates a first image by taking the entire object to be inspected that includes a defect on the surface in response to the user's operation. For example, if the object to be inspected is an automobile, the first imaging unit 112 generates the first image by taking the automobile in accordance with the alignment performed by the user so that the entire automobile is reflected.

The first imaging unit 112 may generate the first image in response to an explicit taking instruction from the user, or it may generate the first image in response to the timing when the object to be inspected is detected by a sensor that automatically detects the object to be inspected.

The guide display unit 113 determines the object to be inspected from the generated first image by using the above model stored in the storage unit 111. In the case where the object to be inspected is an automobile, the above model is a model for determining automobiles learned by using the appearance image of the automobile body, and the learning method and the mode of the model are not limited.

Furthermore, if the storage unit 111 stores a model for determining the type and orientation of the object to be inspected from the target image, the guide display unit 113 uses this model to determine the type and orientation of the object to be inspected from the generated first image. If the object to be inspected is an automobile, this model is a model for determining the type of the automobile and the orientation of the automobile body learned by using the appearance image of the automobile body, and the learning method and the mode of the model are not limited. The configuration may be such that the user directly selects a type of the automobile before the first image is generated by the first imaging unit 112. In this case, the guide display unit 113 uses the model to determine the orientation of the automobile body.

Then, the guide display unit 113 generates an illustration representing the object to be inspected and displays it as a guide on the display unit 114 described below. The guide display unit 113 may generate an illustration representing the type and orientation of the object to be inspected and display it as a guide in the display unit 114 described below. The method by which the guide display unit 113 generates the illustration is arbitrary. For example, a three-dimensional skeleton image according to the type of object to be inspected may be stored in the storage unit 111 in advance, and the guide display unit 113 may rotate the skeleton image according to the determined type and orientation of the object to be inspected and display it on the display unit 114.

The display unit 114 is a device that displays the object to be inspected (the object to be imaged) through the lens, etc. and also displays the guide generated by the guide display unit 113. The display unit 114 is realized by a display device, for example.

The second imaging unit 115 generates a second image by superimposing on the guide of the display unit 114, and taking the object to be inspected. In this exemplary embodiment, a marker is manually attached in a vicinity of the defect of the object to be inspected, and the second imaging unit 115 generates a second image by superimposing on the guide of the display unit 114 under the user's operation, and taking the object to be inspected which the marker is attached.

The marker attached to the object to be inspected in this exemplary embodiment is a recognizable marker regardless of color of an appearance of an object to be inspected. For example, if the object to be inspected is an automobile, the marker attached is a recognizable marker regardless of the body color (painted color). Since the image including the marker and the entire object to be inspected is taken by the second imaging unit 115, the size of the marker is preferably large enough to be recognized when the object to be inspected is taken as a pulled image. For example, it can be formed as a square with a length and width of several centimeters or a circle with a diameter of several centimeters.

Figure 2:
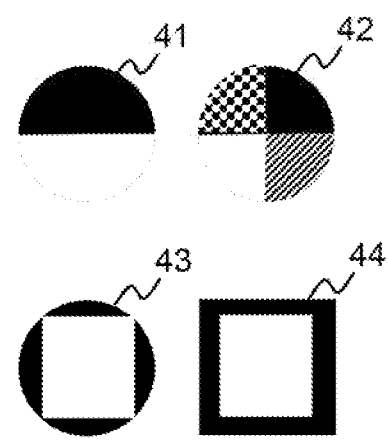
FIG. 2 It depicts an explanatory diagram showing an example of a marker.

FIG. 2 is an explanatory diagram showing an example of a marker. The markers shown in FIG. 2 are examples of recognizable markers regardless of color of an appearance of an object to be inspected. Marker 41 is a circular marker that uses two colors, with each semicircle represented by a different color. Marker 42 is a circular marker that uses four colors, with each of the four equal parts of the circle represented by a different color. Marker 43 is a marker in which the square area inscribed in the circle and the non-square area within the circle are each represented by a different color. Marker 44 is a marker in which a smaller square is placed inside the square, and the area of the inner square and the area of the outer square excluding the area of the inner square are each represented by a different color.

The markers shown in FIG. 2 are examples, and the mode of the markers is not limited to what is illustrated in FIG. 2. Specifically, the markers are preferably formed in such a way that two or more colors are used and at least two colors each can identify part or all of the square or circle. Due to the drawing display, the markers illustrated in FIG. 2 are shown in black and white or white and black shading, but white or black and the shaded area may be represented by colors other than white and black, respectively.

Figure 3:
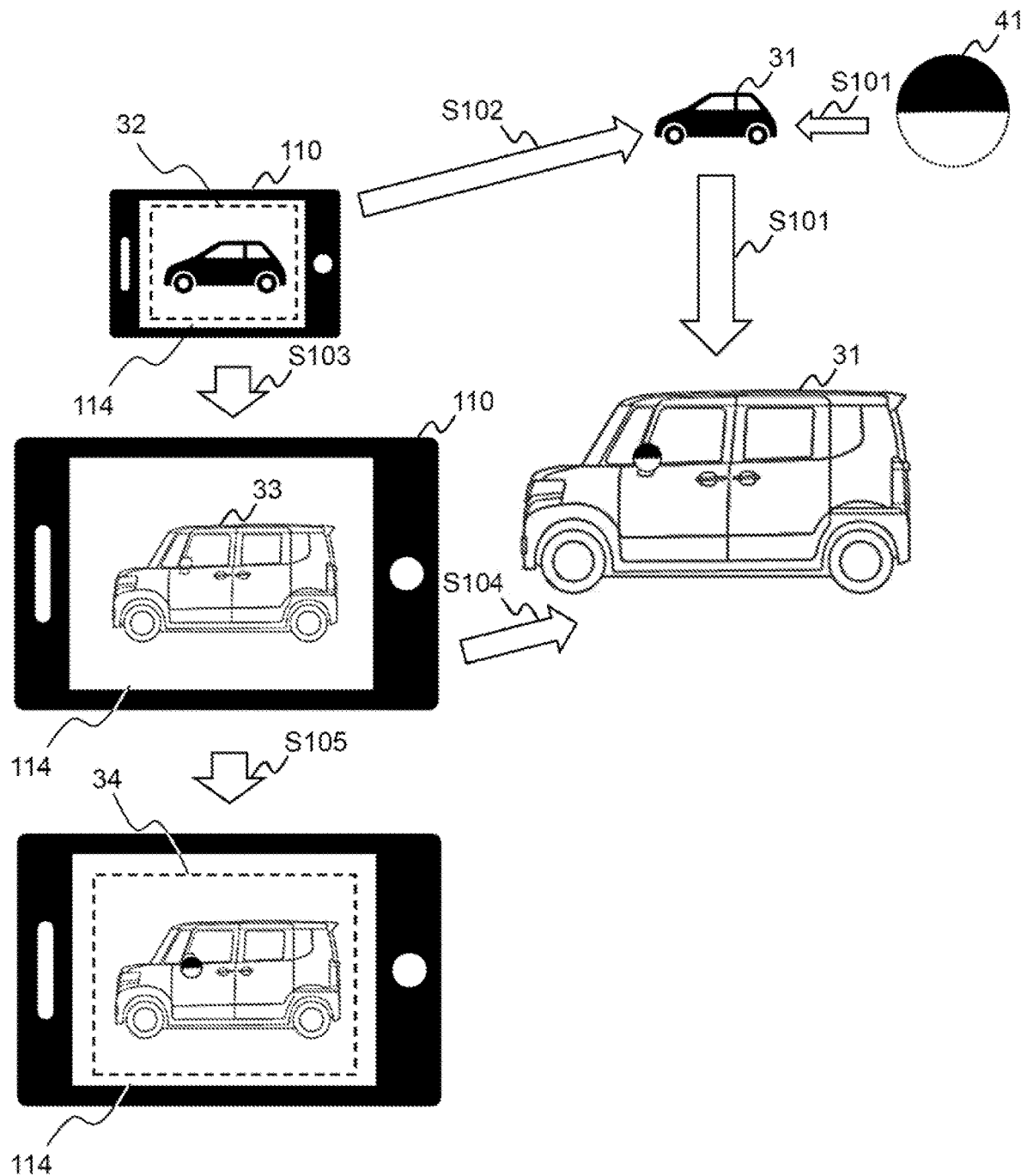
FIG. 3 It depicts an explanatory diagram showing an example of the process until a second image is generated.

FIG. 3 is an explanatory diagram showing an example of the process until a second image is generated. In the example shown in FIG. 3, an automobile is assumed as the object to be inspected. First, a marker 41 is attached to the vicinity of a defect in the automobile 31, the object to be inspected, by a user or the like (step S1). After that, the automobile 31 is displayed on the display unit 114 by the user's operation, etc., and the first imaging unit 112 of the terminal device 110 is used to display the automobile 31. The first imaging unit 112 of the terminal device 1110 generates the first image 32 by taking an image of the automobile 31 including the marker 41 (step S102).

The guide display unit 113 determines the orientation of the automobile 31 from the first image 32 by using the model, and displays the illustration 33 of the automobile 31 on the display unit 114 as a guide (step S103). Thereafter, the second imaging unit 115, by superimposing the guide on the display unit 114 and the automobile 3 by the user's operation or the like (step S104), generates a second image 34 (step S105). In the example shown in FIG. 3, it can be seen that an image of an automobile 31 with a marker 41 attached to the left front mirror is generated as the second image 34.

The identification information input unit 116 receives input of identification information of the object to be inspected. The identification information input unit 116 may directly receive input of the identification information from a user or the like, or may extract the identification information from the taken first image or the second image. If the attributes of the object to be inspected that are associated with the identification information are stored in the storage unit 111, the attributes of the object to be inspected can also be supplemented.

The defect type obtainment unit 117 obtains the type of defect included in the object to be inspected. In this exemplary embodiment, since the first imaging unit 112 and the second imaging unit 115 generate images including the entire object to be inspected, it is difficult to determine the type of defect from the generated images. Therefore, the defect type obtainment unit 117 can accurately collect information on the position of the defect by obtaining the type of defect.

The defect type obtainment unit 117 may receive the input of the defect type from the user or others and obtain the input as the defect type. In addition, a label of a type corresponding to the type of defect may be prepared. In this case, the defect type obtainment unit 117 may extract the label type from the taken second image and determine the defect type based on the extracted label type.

The transmitting unit 118 transmits the generated second image to the server device 120. If the identification information and the type of defect have been obtained, the transmitting unit 118 may transmit the obtained identification information, attributes based on the identification information, and the type of defect to the server device 120.

The server device 120 includes the storage unit 121, an input unit 122, a defect position determination unit 123, a defect part identification unit 124, an information collecting unit 125, an analysis unit 126, and an output unit 127.

The storage unit 121 stores various types of information necessary for the server device 120 to perform processing and information that has been collected. The storage unit 121 may also store a part master associated with information indicating the position in the object to be inspected and a part or parts of the object to be inspected for each type of object to be inspected. The position in the object to be inspected is represented, for example, by a range of three-dimensional coordinates. In the example shown in FIG. 3, the part master holds a correspondence between the left front mirror of an automobile and a range of coordinates indicating the left front mirror for each type of automobile.

The input unit 122 receives the input of the second image from the terminal device 110. The input unit 122 may also receive the input of identification information, attributes based on the identification information, and the type of defect.

The defect position determination unit 123 determines the position of a defect included in the object to be inspected based on the positional relationship between the illustration included in the second image and the marker. Specifically, since in this exemplary embodiment, a defect in the appearance of the object to be inspected is taken, the defect position determination unit 123 may determine the position of the surface of the object to be inspected on the illustration corresponding to the position where the marker was taken. Since the method of identifying the position in a three-dimensional image is widely known, a detailed explanation is omitted here.

The defect part identification unit 124 identifies the part or parts where the defect occurs based on the position of the determined defect based on the part master. This makes it possible to collect information on the specific part or parts where the defect has occurred.

The information collecting unit 125 collects defect information associated with the type of the object to be inspected and the position of the defect, and stores the information in the storage unit 121. If the part or parts where the defect occurred is identifies, the information collecting unit 125 may collect defect information associated with the type of the object to be inspected and the part where the defect occurred. Furthermore, if the type of the object to be inspected and the attributes of the object to be inspected are obtained from the terminal device 110, the information collecting unit 125 may collect defect information that further includes information on these.

In addition, the storage unit 121 stores the identification information of the object to be inspected in correspondence with the attributes of the object to be inspected, and when the input unit 122 receives the input of the identification information of the object to be inspected, the information collecting unit 125 may obtain the attributes corresponding to the identification information from the storage unit 121 and include them in the defect information.

The analysis unit 126 performs a trend analysis of defects based on the collected defect information. The content of the trend analysis performed by the analysis unit 126 is arbitrary. For example, the analysis unit 126 may aggregate the number of occurrences (specifically, the number of applications) for each type of object to be inspected in which a defect occurred and for each part of the defect.

The output unit 127 outputs the analysis results. In addition, in this exemplary embodiment, the output unit 127 outputs an alert based on the collected defect information when the defect information satisfies a predetermined condition. For example, if the number of applications of a certain type of attribute is a certain number or more as a result of aggregation for each defect in the same part, the output unit 127 may output as an alert information associated with the part where the defect occurred and the attribute.

Hereinafter, an example of the trend analysis when the object to be inspected is an automobile will be specifically described. In the case of an automobile, the number of defects in a specific position or type may increase rapidly by a production date, a production plant, or a vehicle type. For this reason, it is preferable to set the number of defect positions and defect types by a production year, a production plant, and a vehicle type as a condition for outputting an alert.

In the early stages of sales or when model changes are made, it is desirable to analyze the trend of defects occurring in different automobile models. This is because when a new line or plant is built or restarted, the possibility of defects occurring increases. In addition, it is preferable to set the conditions set in the past even after the response, assuming that the case where defects that have already been addressed in the past occur again, such as in response to a recall.

The terminal device 110 is realized by, for example, a tablet terminal. Specifically, the first imaging unit 112, the guide display unit 113, the second imaging unit 115, the identification information input unit 116, the defect type obtainment unit 117, and the transmitting unit 118 are realized by a processor (for example, a CPU (Central Processing Unit), a GPU (Graphics Processing Unit)) of a computer that operates according to a program (appearance inspection program).

For example, a program is stored in the storage unit 111, and the processor reads the program, and according to the program, the first imaging unit 112, the guide display unit 113, the second imaging unit 115, the identification information input unit 116, the defect type obtainment unit 117 and the transmitting unit 118 may be operated. In addition, the functions of the terminal device 110 may be provided in the form of SaaS (Software as a Service).

In addition, the first imaging unit 112, the guide display unit 113, the second imaging unit 115, the identification information input unit 116, the defect type obtainment unit 117, and the transmitting unit 118 may each be realized by dedicated hardware. Some or all of the components of each device may be realized by general-purpose or dedicated circuit, a processor, etc., or combinations thereof. These may be configured by a single chip or by multiple chips connected through a bus. Some or all of the components of each device may be realized by a combination of the above-mentioned circuit, etc. and a program.

When some or all of the components of the terminal device 110 is realized by multiple information processing devices, circuits, or the like, the multiple information processing devices, circuits, or the like may be centrally located or distributed. For example, the information processing devices, circuits, etc. may be realized as a client-server system, a cloud computing system, etc., each of which is connected through a communication network.

The server device 120 is realized, for example, by a server device, etc., connected to a storage device. Specifically, the input unit 122, the defect position determination unit 123, the defect part identification unit 124, the information collecting unit 125, the analysis unit 126, and the output unit 127 are realized by a processor of a computer that operates according to a program (defect information collection program).

The storage unit 111 and the storage unit 121 are realized by, for example, a magnetic disk or the like.

Figure 4:
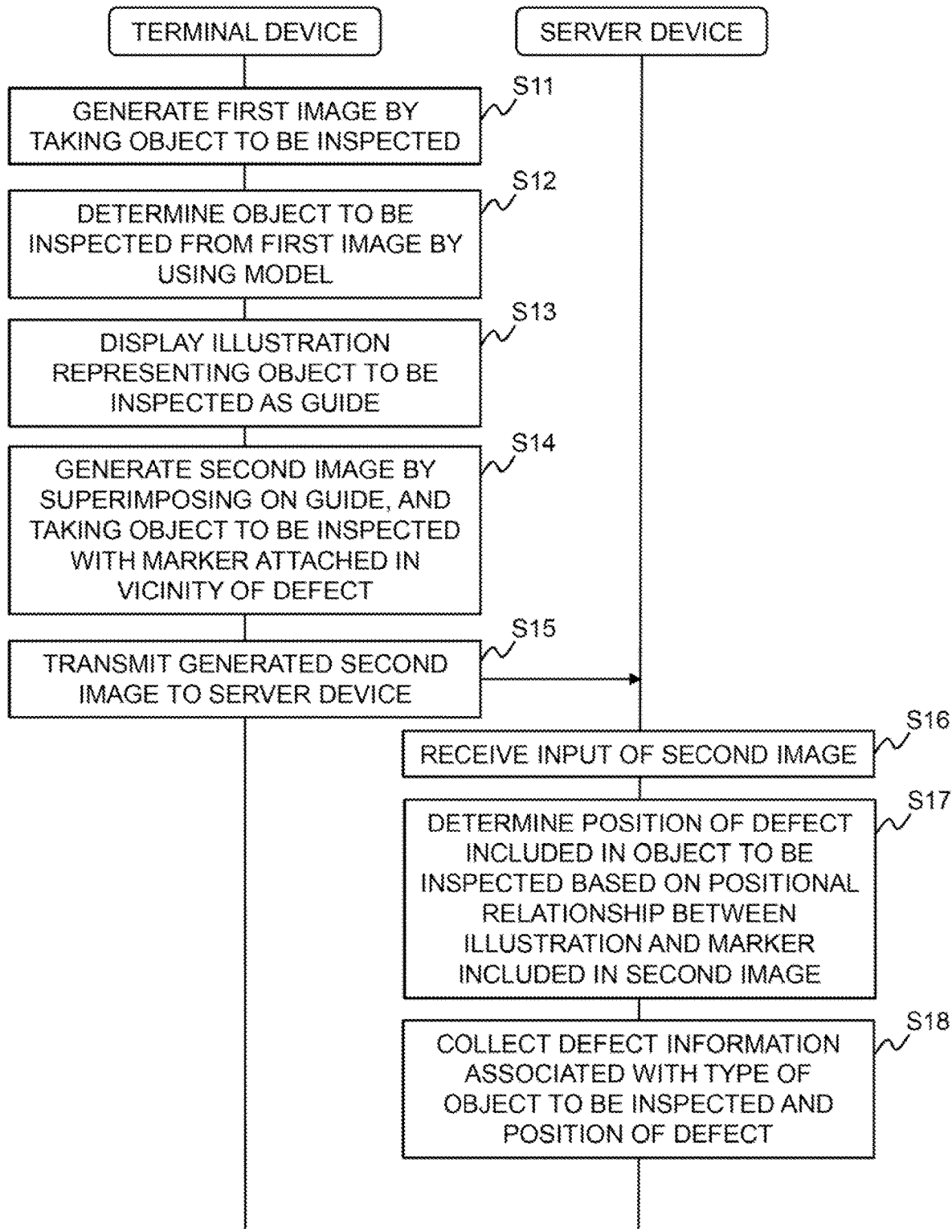
FIG. 4 It depicts a flowchart showing an operation example of the defect position determination system of the first exemplary embodiment.

Next, an operation example of this exemplary embodiment will be described. FIG. 4 is a flowchart showing an operation example of the defect position determination system 10 of this exemplary embodiment.

The first imaging unit 112 of the terminal device 110 generates a first image by taking an object to be inspected (step S11). The guide display unit 113 determines the object to be inspected from the first image by using a model (step S12) and displays an illustration representing the object to be inspected as a guide (step S13). The second imaging unit 115 generates a second image by superimposing on the guide, and taking the object to be inspected with a marker attached in a vicinity of a defect (step S14). Then, the transmitting unit 118 transmits the generated second image to the server device 120 (step S15).

The transmitting unit 118 may transmit the identification information received by the identification information input unit 116 and the defect type obtained by the defect type obtainment unit 117 to the server device 120.

The input unit 122 of the server device 120 receives an input of the second image (step S16). The defect position determination unit 123 determines the position of the defect included in the object to be inspected based on the positional relationship between the illustration and the marker included in the second image (step S17). The defect part identification unit 124 may identify a part or parts where the defect occurred from the position of the determined defect based on the part master. Then, the information collecting unit 125 collects the defect information associated with the type of the object to be inspected and the position of the defect (step S18).

Then, the analysis unit 126 performs a trend analysis of the defect based on the collected defect information, and the output unit 127 outputs the analysis result.

As described above, in this exemplary embodiment, the first imaging unit 112 of the terminal device 110 generates a first image by taking an object to be inspected. The guide display unit 113 determines the object to be inspected from the first image by using a model and displays an illustration representing the object to be inspected as a guide. The second imaging unit 115 generates a second image by superimposing on the guide, and taking the object to be inspected with a marker attached in a vicinity of a defect, and the defect position determination unit 123 of the server device 120 determines the position of the defect included in the object to be inspected based on the positional relationship between the illustration and the marker included in the second image. Then, the information collecting unit 125 collects defect information associated with a type of the object to be inspected and the position of the defect. Therefore, it is possible to accurately collect information on the position of a defect while reducing the man-hours required to determine the position of the defect.

Exemplary Embodiment 2

Next, a second exemplary embodiment of the defect position determination system will be described. In the first exemplary embodiment, a method has been described in which the terminal device 110 generates a second image and transmits it to the server device 120, and the server device 120 determines the position of the defect. In the second exemplary embodiment, a configuration for determining the position of a defect on the device side that generated the second image will be described.

Figure 5:
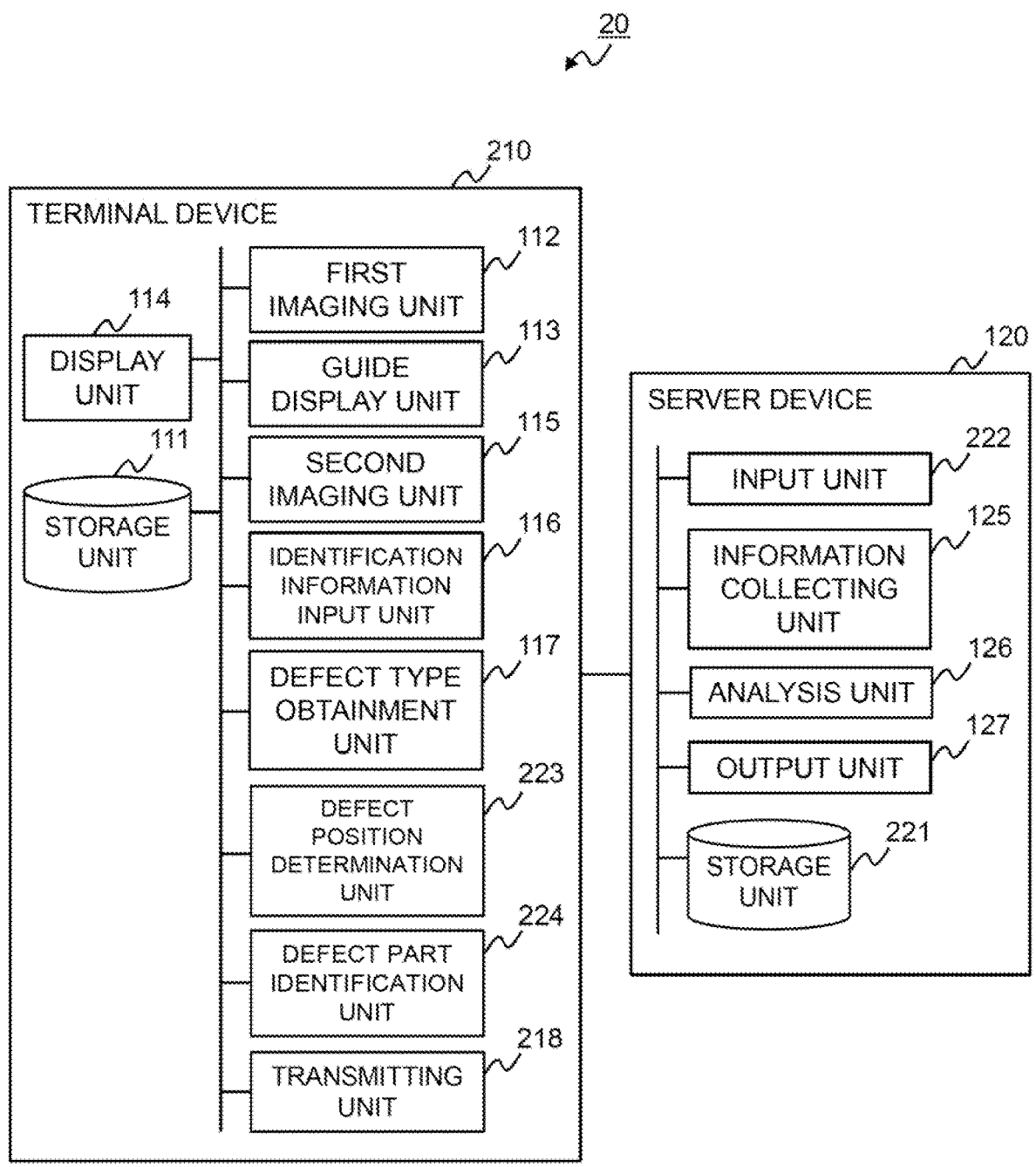
FIG. 5 It depicts a block diagram showing a configuration example of the second exemplary embodiment of a defect position determination system according to the present invention.

FIG. 5 is a block diagram showing a configuration example of the second exemplary embodiment of a defect position determination system according to the present invention. The defect position determination system 20 of this exemplary embodiment includes a terminal device 210 and a server device 220. The terminal device 210 and the server device 220 are connected to each other through a communication network.

The terminal device 210 includes a storage unit 211, the first imaging unit 112, the guide display unit 113, the display unit 114, the second imaging unit 115, the identification information input unit 116, the defect type obtainment unit 117, a transmitting unit 218, a defect position determination unit 223, and a defect part identification unit 224. In other words, the terminal device 210 of this exemplary embodiment is different from the terminal device 110 of the first exemplary embodiment in that the storage unit 211 and the transmitting unit 218 are included in place of the storage unit 111 and the transmitting unit 118, and the defect position determination unit 223 and the defect part identification unit 224 are further included.

In addition, the server device 220 includes a storage unit 221, an input unit 222, the information collecting unit 125, the analysis unit 126, and the output unit 127. In other words, the server device 220 of this exemplary embodiment is different from the server device 120 of the first exemplary embodiment in that the storage unit 221 and the input unit 222 are included in place of the storage unit 121 and the input unit 122, and the defect position determination unit 123 and the defect part identification unit 124 are not included.

The contents of the defect position determination unit 223 and the defect part identification unit 224 are the same as those of the defect position determination unit 123 and the defect part identification unit 124 of the first exemplary embodiment. In other words, the defect position determination system 20 of this exemplary embodiment is a configuration in which the functions of the defect position determination unit 123 and the defect part identification unit 124 of the defect position determination system 10 of the first exemplary embodiment are moved to the terminal device 210. Therefore, the terminal device 210 of this exemplary embodiment can be referred to as an appearance inspection device.

The storage unit 211 may store a part master in addition to the information stored by the storage unit 111 of the first exemplary embodiment. In other words, the storage unit 221 may not store the part master as compared to the storage unit 121 of the first exemplary embodiment. The transmitting unit 218 transmits the position of the defect included in the object to be inspected to the server device 220. The input unit 222 receives an input of the position of the defect included in the object to be inspected.

The terminal device 210 is also realized by, for example, a tablet terminal. Specifically, the first imaging unit 112, the guide display unit 113, the second imaging unit 115, the identification information input unit 116, the defect type obtainment unit 117, the transmitting unit 218, the defect position determination unit 223, and the defect part identification unit 224 are realized by a processor of a computer that operates according to a program (appearance inspection program).

The server device 220 is also realized by, for example, a server device connected to a storage device. Specifically, the input unit 222, the information collecting unit 125, the analysis unit 126, and the output unit 127 are realized by a processor of a computer that operates according to a program (defect information collection program).

The storage unit 211 and the storage unit 221 are realized by, for example, a magnetic disk or the like.

Figure 6:
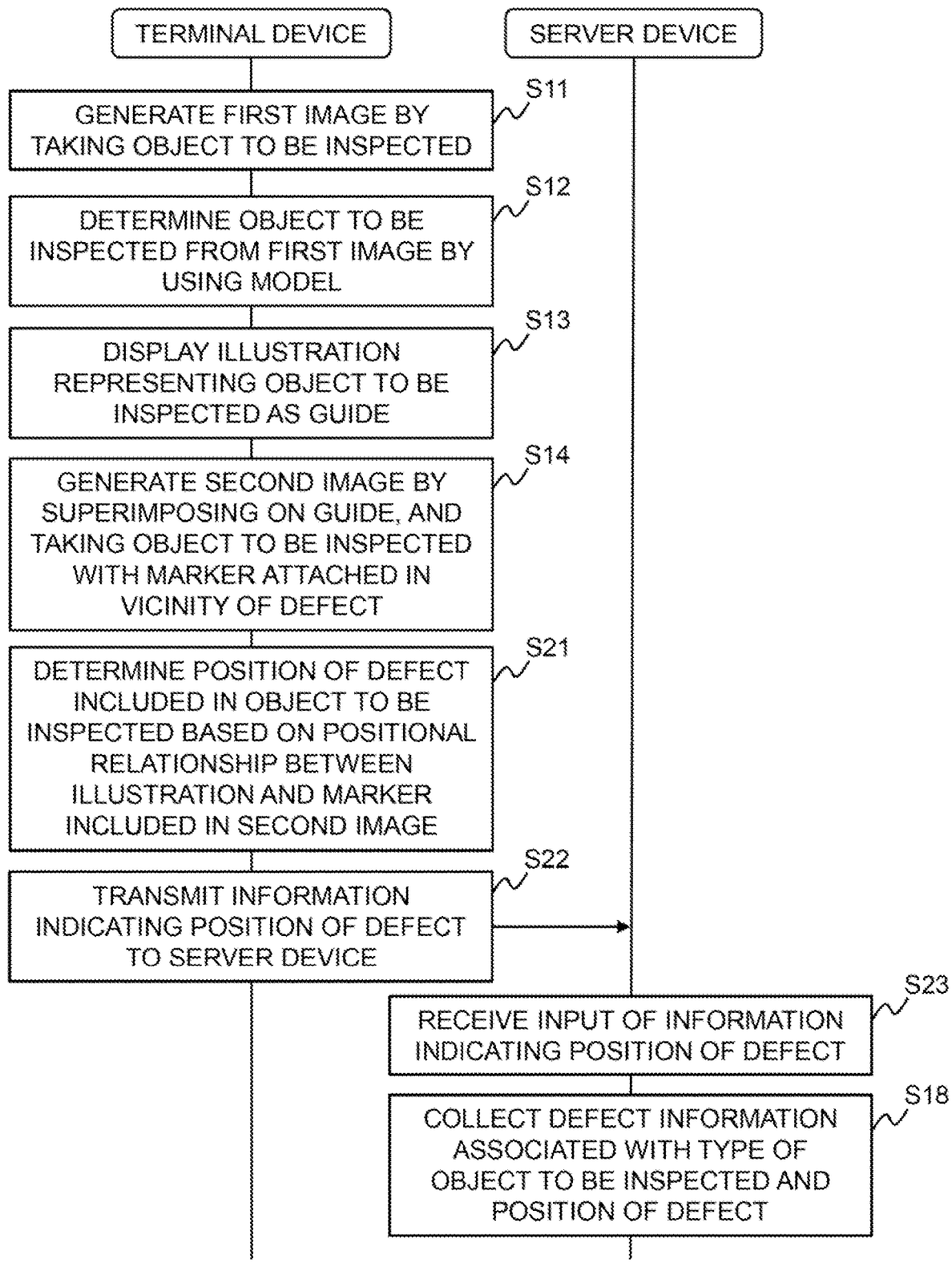
FIG. 6 It depicts a flowchart showing an operation example of the defect position determination system of the second exemplary embodiment.

Next, an operation example of this exemplary embodiment will be described. FIG. 6 is a flowchart showing an operation example of the defect position determination system 20 of this exemplary embodiment. The processing up to the generation of the second image is the same as the processing from step S11 to step S14 illustrated in FIG. 4.

The defect position determination unit 223 of the terminal device 210 determines the position of the defect included in the object to be inspected based on the positional relationship between the illustration and the marker included in the second image (step S21). Then, the transmitting unit 218 transmits information indicating the position of the defect to the server device 220 (step S22).

The input unit 222 of the server device 220 receives an input of the information indicating the position of the defect (step S23). Thereafter, the process of collecting the defect information is similar to the processing of step S18 illustrated in FIG. 4.

As described above, the defect position determination system 20 of this exemplary embodiment can also accurately collect information on the position of a defect while reducing the man-hours required to determine the position of the defect.

The first and second exemplary embodiments illustrate the case where the defect position determination unit and the defect part identification unit are included in the same device. In other cases, the defect position determination system may be configured in which the defect position determination unit is included in the terminal device and the defect part identification unit is included in the server device.

Figure 7:
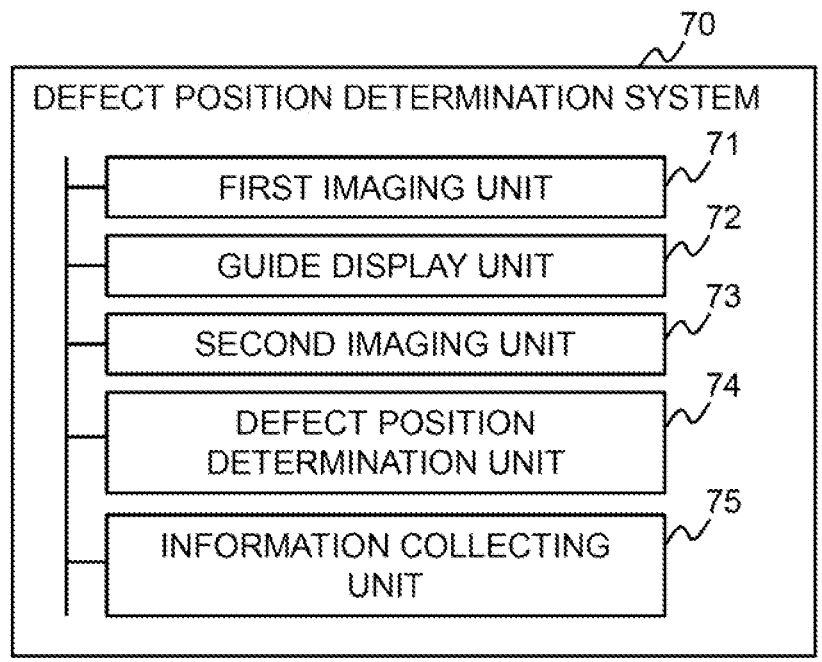
FIG. 7 It depicts a block diagram showing an overview of the defect position determination system according to the present invention.

Next, an overview of the present invention will be described. FIG. 7 is a block diagram showing an overview of the defect position determination system according to the present invention. The defect position determination system 70 (for example, defect position determination systems 10, 20) of the present invention includes a first imaging unit 71 (for example, first imaging unit 112) which generates a first image by taking an object to be inspected (for example, automobile), a guide display unit 72 (for example, guide display unit 113) which determines the object to be inspected from the first image by using a model for determining an object to be inspected from an image, and displays an illustration representing the object to be inspected as a guide for example, on display unit 114), a second imaging unit 73 (for example, second imaging unit 115) which generates a second image by superimposing on the guide, and taking the object to be inspected with a recognizable marker (for example, marker illustrated in FIG. 2) regardless of color of an appearance of an object to be inspected, attached in a vicinity of a defect, a defect position determination unit 74 (for example, defect position determination unit 123, 223) which determines a position of the defect included in the object to be inspected based on a positional relationship between the illustration and the marker included in the second image, and an information collecting unit 75 (for example, information collecting unit 125) which collects defect information associated with a type of the object to be inspected and the position of the defect.

With such a configuration, it is possible to accurately collect information on the position of a defect while reducing the man-hours required to determine the position of the defect.

The defect position determination system 70 may also include a defect part identification unit (for example, defect part identification unit 124, 224) which identifies a part where the defect occurred from the position of the determined defect, based on a part master associated with information indicating the position in the object to be inspected and the part of the object to be inspected for each type of object to be inspected. Then, the information collecting unit 75 may collect the defect information associated with the type of the object to be inspected and the part where the defect occurred.

With such a configuration, it is possible to collect information in units of the part where the defect occurred.

Specifically, the guide display unit 72 may determine the type and orientation of the object to be inspected from the first image by using a model that determines a type and orientation of an object to be inspected from an image, and display the illustration representing the type and orientation of the object to be inspected as a guide.

The defect position determination system 70 may also include an attribute storage unit (for example, storage unit 111) which stores an attribute of the object to be inspected in association with identification information of the object to be inspected, and an identification information input unit (for example, identification information input unit 116) which receives input of the identification information that identifies the object to be inspected. Then, the information collecting unit 75 may collect the defect information associated with the type of object to be inspected, the position of the defect, and the attribute of the object to be inspected identified by the identification information.

The defect position determination system 70 may also include an analysis unit (for example, analysis unit 126) which performs a trend analysis of a defect based on the collected defect information, and an output unit (for example, output unit 127) which outputs an analysis result. The output unit may then output an alert based on the defect information when the collected defect information satisfies a predetermined condition.

Figure 8:
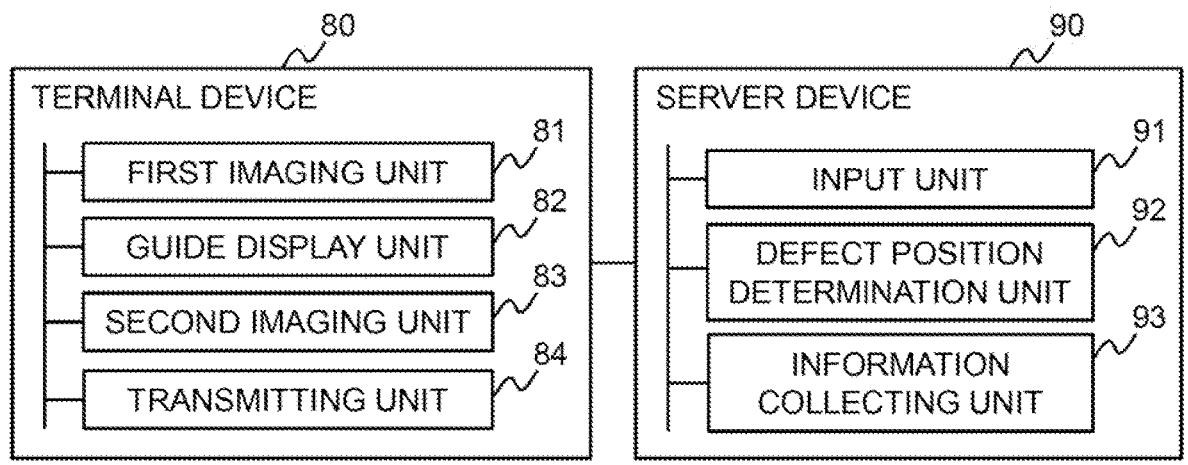
FIG. 8 It depicts a block diagram showing another overview of the defect position determination system according to the present invention.

FIG. 8 is a block diagram showing another overview of the defect position determination system according to the present invention. The other defect position determination system according to the present invention includes a terminal device 80 (for example, terminal device 110) and a server device 90 (for example, server device 120).

The terminal device 80 includes a first imaging unit 81 (for example, first imaging unit 112) which generates a first image by taking an object to be inspected (for example, automobile), a guide display unit 82 (for example, guide display unit 113) which determines the object to be inspected from the first image by using a model for determining an object to be inspected from an image, and displays an illustration representing the object to be inspected as a guide (for example, on display unit 114), a second imaging unit 83 (for example, second imaging unit 115) which generates a second image by superimposing on the guide, and taking the object to be inspected with a recognizable marker (for example, marker illustrated in FIG. 2) regardless of color of an appearance of an object to be inspected, attached in a vicinity of a defect, and a transmitting unit 84 (for example, transmitting unit 118) which transmits the generated second image to the server device 90.

The server device 90 includes an input unit 91 (for example, input unit 122) which receives input of the second image, a defect position determination unit 92 (for example, defect position determination unit 123) which determines the position of the defect included in the object to be inspected based on a positional relationship between the illustration and the marker included in the second image, and an information collecting unit 93 (for example, information collecting unit 125) collects defect information associated with a type of the object to be inspected and the position of the defect.

Even with such a configuration, it is possible to accurately collect information on the position of a defect while reducing the man-hours required to determine the position of the defect.

Figure 9:
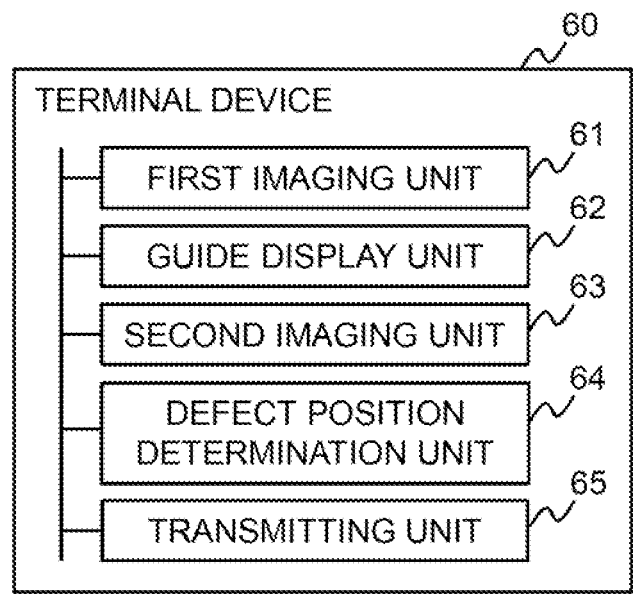
FIG. 9 It depicts a block diagram showing an overview of the terminal device according to the present invention.

FIG. 9 is a block diagram showing an overview of the terminal device according to the present invention. A terminal device 60 (for example, terminal device 210) according to the present invention includes a first imaging unit 61 (for example, first imaging unit 112) which generates a first image by taking an object to be inspected (for example, automobile), a guide display unit 62 (for example, guide display unit 113) which determines the object to be inspected from the first image by using a model for determining an object to be inspected from an image, and displays an illustration representing the object to be inspected as a guide (for example, on display unit 114), a second imaging unit 63 (for example, second imaging unit 115) which generates a second image by superimposing on the guide, and taking the object to be inspected with a recognizable marker (for example, marker illustrated in FIG. 2) regardless of color of an appearance of an object to be inspected, attached in a vicinity of a defect, a defect position determination unit 64 (for example, defect position determination unit 223) which determines a position of the defect included in the object to be inspected based on a positional relationship between the illustration and the marker included in the second image, and a transmission unit 65 (for example, transmitting unit 228) which transmits the determined defect position to a server device (for example, server device 220) collecting defect information associated with a type of the object to be inspected and the position of the defect.

Even with such a configuration, it is possible to accurately collect information on the position of a defect while reducing the man-hours required to determine the position of the defect.

Some or all of the aforementioned exemplary embodiment can be described as supplementary notes mentioned below, but are not limited to the following supplementary notes.

(Supplementary note 1) A defect position determination system comprising: a first imaging unit which generates a first image by taking an object to be inspected, a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; a defect position determination unit which determines a position of the defect included in the object to be inspected based on a positional relationship between the illustration and the marker included in the second image; and an information collecting unit which collects defect information associated with a type of the object to be inspected and the position of the defect.

(Supplementary note 2) The defect position determination system according to Supplementary note 1, further comprising a defect part identification unit which identifies a part where the defect occurred from the position of the determined defect, based on a part master associated with information indicating the position in the object to be inspected and the part of the object to be inspected for each type of object to be inspected, wherein the information collecting unit collects the defect information associated with the type of the object to be inspected and the part where the defect occurred.

(Supplementary note 3) The defect position determination system according to Supplementary note 1 or 2, wherein the guide display unit determines the type and orientation of the object to be inspected from the first image by using a model that determines a type and orientation of an object to be inspected from an image, and displays the illustration representing the type and orientation of the object to be inspected as a guide.

(Supplementary note 4) The defect position determination system according to any one of Supplementary notes 1 to 3, further comprising: an attribute storage unit which stores an attribute of the object to be inspected in association with identification information of the object to be inspected; and an identification information input unit which receives input of the identification information that identifies the object to be inspected, wherein the information collecting unit collects the defect information associated with the type of object to be inspected, the position of the defect, and the attribute of the object to be inspected identified by the identification information.

(Supplementary note 5) The defect position determination system according to any one of Supplementary notes 1 to 4, further comprising: an analysis unit which performs a trend analysis of a defect based on the collected defect information; and an output unit which outputs an analysis result, wherein the output unit outputs an alert based on the defect information when the collected defect information satisfies a predetermined condition.

(Supplementary note 6) The defect position determination system according to any one of Supplementary notes 1 to 5, further comprising a defect type obtainment unit which obtains the type of the defect included in the object to be inspected, wherein the information collecting unit collects the defect information associated with the type of object to be inspected, the position of the defect, and the type of the defect.

(Supplementary note 7) A defect position determination system comprising: a terminal device; and a server device, wherein the terminal device including: a first imaging unit which generates a first image by taking an object to be inspected, a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; and a transmitting unit which transmits the generated second image to the server device, wherein the server device including: an input unit which receives input of the second image; a defect position determination unit which determines the position of the defect included in the object to be inspected based on a positional relationship between the illustration and the marker included in the second image; and an information collecting unit which collects defect information associated with a type of the object to be inspected and the position of the defect.

(Supplementary note 8) A defect position determination system comprising: a terminal device, and a server device, wherein the terminal device includes a first imaging unit which generates a first image by taking an object to be inspected; a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; a defect position determination unit which determines the position of the defect included in the object to be inspected based on a positional relationship between the illustration and the marker included in the second image; and a transmitting unit which transmits the determined defect position to the server device, wherein the server device including an information collecting unit which collects defect information associated with a type of the object to be inspected and the position of the defect.

(Supplementary note 9) A terminal device comprising: a first imaging unit which generates a first image by taking an object to be inspected; a guide display unit which determines the object to be inspected from the first image by using a model for determining an object to be inspected from an image, and displays an illustration representing the object to be inspected as a guide; a second imaging unit which generates a second image by superimposing on the guide, and taking the object to be inspected with a recognizable marker regardless of color of an appearance of an object to be inspected, attached in a vicinity of a defect; a defect position determination unit which determines a position of the defect included in the object to be inspected based on a positional relationship between the illustration and the marker included in the second image; and a transmission unit which transmits the determined defect position to a server device collecting defect information associated with a type of the object to be inspected and the position of the defect.

(Supplementary note 10) A defect position determination method comprising: generating a first image by taking an object to be inspected; determining the object to be inspected from the first image by using a model for determining an object to be inspected from an image, and displaying an illustration representing the object to be inspected as a guide; generating a second image by superimposing on the guide, and taking the object to be inspected with a recognizable marker regardless of color of an appearance of an object to be inspected, attached in a vicinity of a defect; determining a position of the defect included in the object to be inspected based on a positional relationship between the illustration and the marker included in the second image; and collecting defect information associated with a type of the object to be inspected and the position of the defect.

(Supplementary note 11) The defect position determination method according to Supplementary note 10, further comprising: identifying a part where the defect occurred from the position of the determined defect, based on a part master associated with information indicating the position in the object to be inspected and the part of the object to be inspected for each type of object to be inspected; and collecting the defect information associated with the type of the object to be inspected and the part where the defect occurred.

(Supplementary note 12) An appearance inspection method comprising: generating a first image by taking an object to be inspected; determining the object to be inspected from the first image by using a model for determining an object to be inspected from an image, and displaying an illustration representing the object to be inspected as a guide; generating a second image by superimposing on the guide, and taking the object to be inspected with a recognizable marker regardless of color of an appearance of an object to be inspected, attached in a vicinity of a defect; determining a position of the defect included in the object to be inspected based on a positional relationship between the illustration and the marker included in the second image; and transmitting the determined defect position to a server device collecting defect information associated with a type of the object to be inspected and the position of the defect.

(Supplementary note 13) An appearance inspection method according to Supplementary note 12, further comprising identifying a part where the defect occurred from the position of the determined defect, based on a part master associated with information indicating the position in the object to be inspected and the part of the object to be inspected for each type of object to be inspected.

(Supplementary note 14) A program recording medium in which an appearance inspection program is recorded, the appearance inspection program causes a computer to execute: first imaging process of generating a first image by taking an object to be inspected; a guide display process of determining the object to be inspected from the first image by using a model for determining an object to be inspected from an image, and displaying an illustration representing the object to be inspected as a guide; a second imaging process of generating a second image by superimposing on the guide, and taking the object to be inspected with a recognizable marker regardless of color of an appearance of an object to be inspected, attached in a vicinity of a defect; defect position determination process of determining a position of the defect included in the object to be inspected based on a positional relationship between the illustration and the marker included in the second image; and transmission process of transmitting the determined defect position to a server device collecting defect information associated with a type of the object to be inspected and the position of the defect.

(Supplementary note 15) The program recording medium according to Supplementary note 14, in which an appearance inspection program is recorded, the appearance inspection program causes a computer to execute defect part identification process of identifying a part where the defect occurred from the position of the determined defect, based on a part master associated with information indicating the position in the object to be inspected and the part of the object to be inspected for each type of object to be inspected.

While the present invention has been described above with reference to exemplary embodiments and examples, but the present invention is not limited to the above exemplary embodiments and examples. Various changes understandable to those skilled in the art within the scope of the present invention can be made to the structures and details of the present invention.

REFERENCE SIGNS LIST 10, 20 Defect position determination system
110, 210 Terminal device
120, 220 Server device
111, 211 Storage unit
112 First imaging unit
113 Guide display unit
114 Display unit
115 Second imaging unit
116 Identification information input unit
117 Defect type obtainment unit
118, 218 Transmitting unit
121, 221 Storage unit
122, 222 Input unit
123, 223 Defect position determination unit
124, 224 Defect part identification unit
125 Information collecting unit
126 Analysis unit
127 Output unit
31 Automobile
32 First image
33 Guide
34 Second image
41-44 Marker

What is claimed is:

1. A defect position determination system comprising:
a memory storing instructions; and
one or more processors configured to execute the instructions to:
generate a first image by taken of an object to be inspected;
determine the object to be inspected from the first image by using a model for determining an object to be inspected from an image, display an illustration representing the object to be inspected as a guide;
generate a second image taken of the object to be inspected by superimposing on the guide, the object to be inspected being with a marker attached in a vicinity of a defect, the marker being recognizable regardless of color of an appearance of an object to be inspected;
determine a position of the defect included in the object to be inspected based on a positional relationship between the illustration and the marker included in the second image; and
collect defect information associated with a type of the object to be inspected and the position of the defect.

2. The defect position determination system according to claim 1, wherein the processor further executes instructions to:
identify a part where the defect occurred from the position of the determined defect, based on a part master representing correspondence between information indicating the position in the object to be inspected and the part of the object to be inspected for each type of object to be inspected; and
collect the defect information associated with the type of the object to be inspected and the part where the defect occurred.

3. The defect position determination system according to claim 1, wherein the processor further executes instructions to
determine the type and orientation of the object to be inspected from the first image by using a model that determines a type and orientation of an object to be inspected from an image, and display the illustration representing the type and orientation of the object to be inspected as a guide.

4. The defect position determination system according to claim 1, further comprising:
an attribute storage which stores an attribute of the object to be inspected in association with identification information of the object to be inspected,
wherein the processor further executes instructions to:
receive input of the identification information that identifies the object to be inspected; and
collect the defect information associated with the type of object to be inspected, the position of the defect, and the attribute of the object to be inspected identified by the identification information.

5. The defect position determination system according to claim 1, wherein the processor further executes instructions to:
perform a trend analysis of a defect based on the collected defect information;
output an analysis result; and
output an alert based on the defect information when the collected defect information satisfies a predetermined condition.

6. The defect position determination system according to claim 1, wherein the processor further executes instructions to:
obtain the type of the defect included in the object to be inspected; and
collect the defect information associated with the type of object to be inspected, the position of the defect, and the type of the defect.

7. A defect position determination system comprising:
a terminal device; and
a server device,
wherein the terminal device including:
a first imaging unit which generates a first image taken of an object to be inspected;
a guide display unit which determines the object to be inspected from the first image by using a model for determining an object to be inspected from an image, displays an illustration representing the object to be inspected as a guide;
a second imaging unit which generates a second image taken of the object to be inspected by superimposing on the guide, the object to be inspected being with a marker attached in a vicinity of a defect, the marker being recognizable regardless of color of an appearance of an object to be inspected; and
a transmitting unit which transmits the generated second image to the server device,
wherein the server device including:
an input unit which receives input of the second image;
a defect position determination unit which determines the position of the defect included in the object to be inspected based on a positional relationship between the illustration and the marker included in the second image; and an information collecting unit which collects defect information associated with a type of the object to be inspected and the position of the defect.

8. A terminal device comprising:

a memory storing instructions; and one or more processors configured to execute the instructions to:

generate a first image taken of an object to be inspected;

determine the object to be inspected from the first image by using a model for determining an object to be inspected from an image, display an illustration representing the object to be inspected as a guide;

generate a second image taken of the object to be inspected by superimposing on the guide, the object to be inspected being with a marker attached in a vicinity of a defect, the marker being recognizable regardless of color of an appearance of an object to be inspected;

determine a position of the defect included in the object to be inspected based on a positional relationship between the illustration and the marker included in the second image; and transmit the determined defect position to a server device collecting defect information associated with a type of the object to be inspected and the position of the defect.

* * * * *